Figures 1, 2:
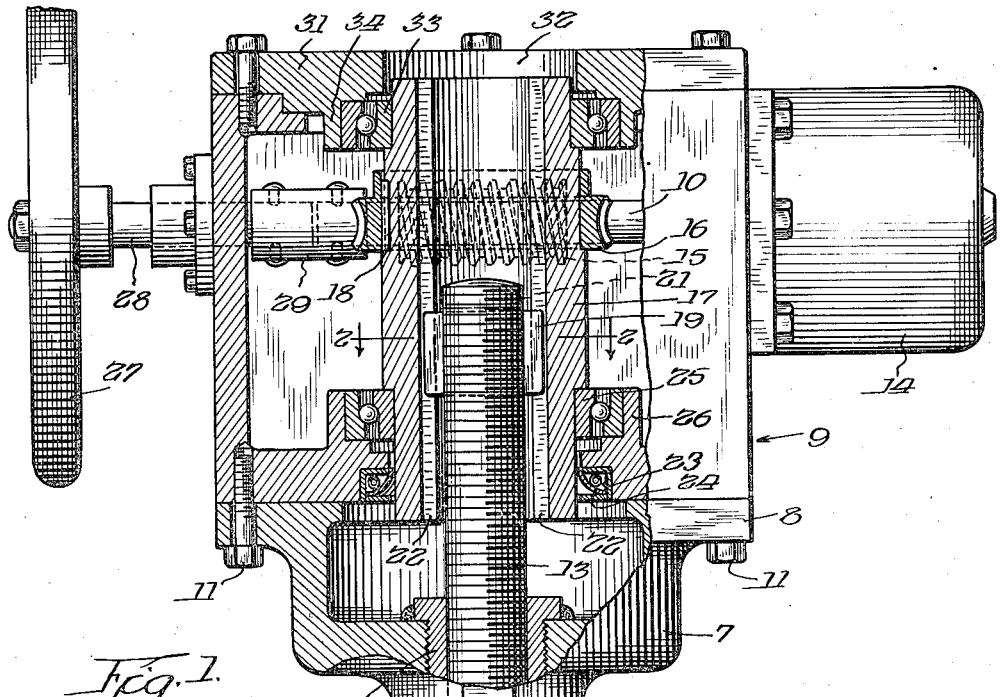

Oct. 26, 1948.   C. W. BRYANT   2,452,428
FLEXIBLE VALVE STEM DRIVE
Filed Aug. 30, 1945

Inventor:
Corwin W. Bryant
By: Joseph O. Lange, Atty.

Patented Oct. 26, 1948

2,452,428

UNITED STATES PATENT OFFICE 2,452,428

FLEXIBLE VALVE STEM DRIVE

Corwin W. Bryant, Downers Grove, Ill., assignor to Crane Co., Chicago, Ill., a corporation of Illinois Application August 30, 1945, Serial No. 613,579

1 Claim. (Cl. 74—504)

This invention relates to valve actuating means or the like. More particularly it pertains to a novel, flexible valve stem drive suitable for valve operation, but which is also capable of being applied to numerous installations wherein flexibility in actuation is desirable. Briefly, it is one of the more important objects of this invention to provide a flexible type of drive coupling in a geared or power drive on a valve which is relatively easy to install and to maintain.

A further important object is to provide a construction in which the valve crosshead or valve stem holder may be eliminated by simplifying the arrangement overall both in compactness and in the number of parts required.

A further object is to provide a construction in which the cost of manufacture is substantially reduced and in which previous close machining operations have been eliminated to a large degree.

A further object is to provide a construction in which the design is substantially simplified in contrast to that employing a plurality of keys or a spline drive.

To obtain a better appreciation of the background of this invention, it should be understood that heretofore much difficulty has been encountered in providing concentricity between the valve stem and the power unit sleeve when making the final assembly. The instant contribution overcomes such shortcomings.

Previously on power applications of certain types of globe valves, for example, it has been the practice to place two separate keys diametrically opposite on valve stems for driving purposes, resulting in relative rigidity therebetween which proved to be very objectionable. In the current invention, a single loose fitting key passing transversely through the stem is preferably employed in which the stem has desirable clearance in the unit sleeve. Thus there exists no rigid connection between the stem and the sleeve and accordingly a flexible drive is effected.

It should of course be understood with such flexibility that in addition to the advantages above mentioned, the ordinary wear and ultimate breaking down of the affected operating parts has been very significantly reduced.

Other objects and advantages from the construction will become more readily apparent upon proceeding with the following specification read in light of the accompanying drawing, in which Fig. 1 is a fragmentary sectional assembly view of the flexible drive of this invention applied to a conventional valve.

Fig. 2 is a sectional view taken on the line 2—2 of Fig. 1.

Similar reference characters refer to similar parts in the views mentioned.

Referring now to Fig. 1, the valve bonnet 1 shown is normally attached by means of bolts (not shown) to the usual valve casing which is also not shown. The upper portion of the said bonnet is provided in the usual manner with the substantially tubular extension 2 forming a stuffing box for the gland 3 by means of the eye bolt gland studs 4 bearing against the usual gland flange 5, the compression of the packing being accomplished by tightening the nuts 6. At the upper portion of the bonnet at enlarged cup section 7 is provided having the annular flange 8 and upon which the gear housing, generally designated 9, is supported and held by means of the stud bolts 11.

Within the lower portion of the cupped section 7 of the bonnet the usual internally threaded yoke bushing 12 is provided and within which the rotatable, reciprocably movable stem 13 is threadedly journaled for desired reciprocating movement in opening and closing the valve, a closure member (not shown) being attached to the lower end of the stem 13 in one of several conventional ways. At an offset end portion of the gear housing 9 a motor 14 is mounted which may be either fluid or electrically driven and which being connected by a shaft 10 rotates the worm 15. As indicated, the latter member is in mesh with the worm wheel 16. The worm wheel is non-rotatably mounted upon an annular shoulder of the turret sleeve 17 by means of a keyed connection designated 18 whereby the turret sleeve may be suitably rotated for actuation of the stem as hereinafter explained in more detail.

At this stage of the description of the construction, attention specially directed to the novel feature constituting the essential element of this invention. Ordinarily in prior structures the valve stem 13 may be threadedly mounted within the sleeve 17 to provide a relatively rigid connection therebetween. In this contribution, however, the valve stem is provided with a loosely fitted drive key 19 as shown (also see Fig. 2) loosely fitting within the diametrically extending slot 21 and engaging the oppositely disposed slots 22, provided in the turret sleeve 17. It will thus be apparent that by virtue of the construction shown, the valve stem, upon rotation of the sleeve 17, will likewise be turned in view of the engagement of the end portions of the drive key 19 with the slots 22. The lower portion of the gear housing 9 is provided with the recess 23 having the lubricant seal 24, the sleeve 17 being journally supported upon the inner race of the thrust bearing 25, the latter member in turn being positioned by the lower thrust bearing retainer wall 26. The upper portion of the turret sleeve is supported by means of the thrust bearing 33 mounted in the retainer wall 34 of the cap 31. For the purpose of providing hand operation by the handwheel member 27, the extension shaft 28 is coupled to the worm shaft by means of the coupling 29. The upper portion of the casing 9 may be closed in the usual manner by the cap 31 having a central opening 32 if necessary to permit the stem to rise therethrough when the valve closure member is in the open position. It has been found under some circumstances, depending upon the lift of the valve, that the opening 32 may be closed, since the stem 13 need not necessarily project through the cap 31.

From the foregoing description it will be apparent that the usual difficulty arising in providing for concentricity in a flexible coupling between the valve stem and the power unit sleeve in its final assembly has been satisfactorily overcome. A compact design has been provided which meets minimum space requirements and, in addition the design has been very much simplified from both assembly and cost standpoints.

Clearly, previous costly fitting and tendencies to bind have been overcome by having the valve stem rotated by the unit sleeve by the drive key extending through the stem and moving within the slots 22 of the sleeve. In actual operation, the stem threads engage the yoke bushing and upon rotation of the stem the valve closure member moves upward or downward, thus opening or closing the valve as desired. It will be apparent that because the drive key 19 is loosely fitted within the stem slot 21 and since the slots 22 in the unit sleeve afford similar clearance, the stem mounting provides a clearance relative to the drive which permits a predetermined desirable freedom of motion. Under certain conditions it has been found that a hardened drive key is more acceptable and it might be equally desirable in reducing manufacturing costs further to provide a special milling cutter to slot the stem.

Obviously the structural details may vary substantially from that shown and described and therefore it is the desire that the scope of this invention be measured by the appended claim interpreted in light of the prior art.

I claim:

In a valve actuating mechanism, a combination comprising a housing, a valve bonnet cooperating with the said housing, a valve stem suitable for rotative and reciprocating movement relative to the said housing and said bonnet, a sleeve snugly journaled for rotative movement in the said housing and surrounding a portion of the said valve stem, the said stem being closely journaled for rotative and longitudinal movement in the said valve bonnet, driving means for rotating the said sleeve, a flat plate member serving as the driving connection between the said sleeve and the said stem, the said flat plate member extending diametrically across the upper end of the said stem and being relatively loosely carried in a transverse slotted opening extending through the longitudinal axis of the said stem at the upper end portion thereof, the said flat plate member being smaller in thickness than the width of the slotted opening of the stem and also being smaller than the height of the said slotted opening, the said sleeve having diametrically disposed, longitudinally extending slots to receive projecting end portions of the said flat plate member, the slots being of greater width than the thickness of the said flat plate member, and the distance between the bottoms of the said slots in the sleeve being greater than the length of the said flat plate member.

CORWIN W. BRYANT.

REFERENCES CITED

The following references are of record in the file of this patent:

UNITED STATES PATENTS

| Number | Name | Date |
| --- | --- | --- |
| 679,518 | Skirrow | July 30, 1901 |
| 1,786,810 | Yoder | Dec. 30, 1930 |
| 1,847,693 | Kindervater | Mar. 1, 1932 |
| 2,150,813 | Ball | Mar. 14, 1939 |
| 2,340,999 | Trott | Feb. 8, 1944 |
| 2,352,140 | Trott | June 20, 1944 |

FOREIGN PATENTS

| Number | Country | Date |
| --- | --- | --- |
| 842,323 | France | Feb. 27, 1939 |